(12) United States Patent
Yeh et al.

(10) Patent No.: US 10,823,504 B2
(45) Date of Patent: Nov. 3, 2020

(54) SMART OVEN FOR DRYING SHOE COMPONENTS

(71) Applicant: POU CHEN CORPORATION, Chang Hwa Hsien (TW)

(72) Inventors: Yun-An Yeh, Chang Hwa Hsien (TW); Yu-Fong Yang, Chang Hwa Hsien (TW)

(73) Assignee: POU CHEN CORPORATION, Chang Hwa Hsien (TW)

( * ) Notice: Subject to any disclaimer, the term of this patent is extended or adjusted under 35 U.S.C. 154(b) by 229 days.

(21) Appl. No.: 15/982,136

(22) Filed: May 17, 2018

(65) Prior Publication Data

US 2019/0011182 A1    Jan. 10, 2019

(30) Foreign Application Priority Data

Jul. 7, 2017 (TW) ............................. 106122814 A

(51) Int. Cl.
*F26B 25/02* (2006.01)
*F26B 9/06* (2006.01)
(Continued)

(52) U.S. Cl.
CPC .............. *F26B 25/02* (2013.01); *A43D 25/18* (2013.01); *A43D 25/20* (2013.01); *A47L 23/205* (2013.01);
(Continued)

(58) Field of Classification Search
CPC ....... A43D 25/18; A43D 25/20; A47L 23/205; B29D 35/00; F26B 25/02; F26B 25/20; F26B 3/30; F26B 9/06
See application file for complete search history.

(56) References Cited

U.S. PATENT DOCUMENTS

| 3,517,160 A * | 6/1970 | Maga ..................... A43D 25/20 |
| | | 219/215 |
| 2017/0360157 A1* | 12/2017 | Regan .................. A43D 117/00 |

FOREIGN PATENT DOCUMENTS

| CH | 254882 A * | 5/1948 | ............. A43D 25/20 |
| CN | 201515749 U | 6/2010 | |
| | (Continued) | | |

OTHER PUBLICATIONS

Search Report appended to an Office Action, which was issued to Taiwanese counterpart application No. 106122814 by the TIPO dated Jan. 22, 2018, with an English translation thereof.
(Continued)

*Primary Examiner* — Jorge A Pereiro
*Assistant Examiner* — Logan P Jones
(74) *Attorney, Agent, or Firm* — Hamre, Schumann, Mueller & Larson, P.C.

(57) ABSTRACT

A smart oven includes a box body unit, a heating unit and a feed unit. The box body unit includes a box body that has a first inner wall surface, two second inner wall surfaces, two third inner wall surfaces, and a heating chamber having a chamber opening that faces downward. The heating unit includes a plurality of upper radiation heating lamps disposed above the chamber opening, and a plurality of outer radiation heating lamps disposed in proximity to the second and third inner wall surfaces. The feed unit includes a carrier platform that is movable relative to the box body between a material-placing position and a material-operating position, in which the carrier platform is distal from and closes the chamber opening, respectively.

10 Claims, 13 Drawing Sheets

(51) Int. Cl.
    *A43D 25/18*    (2006.01)
    *F26B 3/30*    (2006.01)
    *A43D 25/20*    (2006.01)
    *B29D 35/00*    (2010.01)
    *A47L 23/20*    (2006.01)
    *F26B 25/20*    (2006.01)

(52) U.S. Cl.
    CPC ............... *B29D 35/00* (2013.01); *F26B 3/30* (2013.01); *F26B 9/06* (2013.01); *F26B 25/20* (2013.01)

(56) References Cited

FOREIGN PATENT DOCUMENTS

| | | | | |
|---|---|---|---|---|
| CN | 204218048 | U | 3/2015 | |
| CN | 205536992 | U | 8/2016 | |
| CN | 205568052 | U | 9/2016 | |
| DE | 874717 | C * | 4/1953 | ............. A43D 25/20 |
| DE | 2651118 | A1 * | 5/1978 | ............. A43D 25/20 |
| GB | 576829 | A * | 4/1946 | ................ F26B 3/28 |
| JP | 6-281337 | A | 10/1994 | |
| JP | 2001-358049 | A | 12/2001 | |
| JP | 2005-533378 | A | 11/2005 | |
| TW | 258869 | | 10/1995 | |
| TW | 404183 | U | 9/2000 | |
| WO | WO-2007096749 | A1 * | 8/2007 | ............. A43D 25/20 |

OTHER PUBLICATIONS

Search Report appended to an Office Action, which was issued to Chinese counterpart application No. 201710551830.7 by the CNIPA dated Dec. 24, 2019, with an English translation thereof (5 pages).
Office Action issued to Japanese counterpart application No. 2018-107449 by the JPO dated Jun. 4, 2019 (2 pages).

* cited by examiner

SMART OVEN FOR DRYING SHOE COMPONENTS

CROSS-REFERENCE TO RELATED APPLICATION

This application claims priority to Taiwanese Application No. 106122814, filed on Jul. 7, 2017.

FIELD

The disclosure relates to an oven, more particularly to a smart oven for drying shoe components.

BACKGROUND

Referring to FIG. 1, an oven 1 for drying a shoe component, as disclosed in Taiwanese Patent No. I468139B, is shown to include a base 11 having a heating channel 10 extending along a horizontal direction, a plurality of heating lamps (not shown) disposed on top and two lateral sides of the heating channel 10, and a conveying unit 12 movably disposed on the base 11 along the horizontal direction. The heating channel 10 has an inlet 101 and an outlet 102 opposite to the inlet 101. The conveying unit 12 includes a roller conveyor 121 passing through the heating channel 10, a plurality of gears (not shown) disposed on the base 11 for driving the roller conveyor 121 to repeatedly turn in only one direction, an upper slider 122 connected to the roller conveyor 121 and proximate to the inlet 101, and a lower slider 123 connected to the roller conveyor 121 and proximate to the outlet 102.

To use the oven 1, a shoe component (not shown) is first placed on the upper slider 122, after which it is slowly conveyed by the roller conveyor 121 into the heating channel 10 through the inlet 101. As the shoe component moves along with the roller conveyor 121, the heating lamps disposed on the top and the lateral sides of the heating channel 10 will coordinate with a blower (not shown) to produce airflow for heating and drying the shoe component through heat convection. Finally, when the shoe component passes through the outlet 102 to the lower slider 123, the drying operation of the shoe component is completed. However, to obtain a sufficient drying time, the length of the heating channel 10 of the oven 1 must be prolonged to extend the time of the shoe component in the heating channel 10. This will result in increasing the size of the oven 1 such that the oven 1 occupies a substantial space, and will also result in difficult arrangement of the production line. Further, because the shoe component moves along with the roller conveyor 121 in the horizontal direction, the heating lamps can only be disposed on the top and lateral sides of the heating channel 10, so that the distribution of heat is not uniform, and the drying effect is poor.

SUMMARY

Therefore, an object of the present disclosure is to provide a smart oven that is capable of overcoming at least one of the drawbacks of the prior art.

Accordingly, a smart oven of this disclosure includes a box body unit, a heating unit and a feed unit. The box body unit includes a box body that has a first inner wall surface extending horizontally in a left-right direction, two second inner wall surfaces connected angularly and respectively to left and right ends of the first inner wall surface, and two third inner wall surfaces connected angularly and respectively to front and rear ends of the first inner wall surface. One of the third inner wall surfaces is further angularly connected between front ends of the second inner wall surfaces. The other third inner wall surface is further angularly connected between rear ends of the second inner wall surfaces. The first, second and third inner wall surfaces cooperatively define a heating chamber that has a chamber opening facing downward. The heating unit is accommodated in the heating chamber and includes a plurality of upper radiation heating lamps disposed above the chamber opening, and a plurality of outer radiation heating lamps disposed in proximity to the second inner wall surfaces and the third inner wall surfaces. The feed unit is disposed on the box body unit and includes a carrier platform, and a drive mechanism for driving the carrier platform to move up and down along a top-bottom direction transverse to the left-right direction. The carrier platform is movable relative to the box body between a material-placing position, in which the carrier platform is distal from the chamber opening, and a material-operating position, in which the carrier platform closes the chamber opening.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
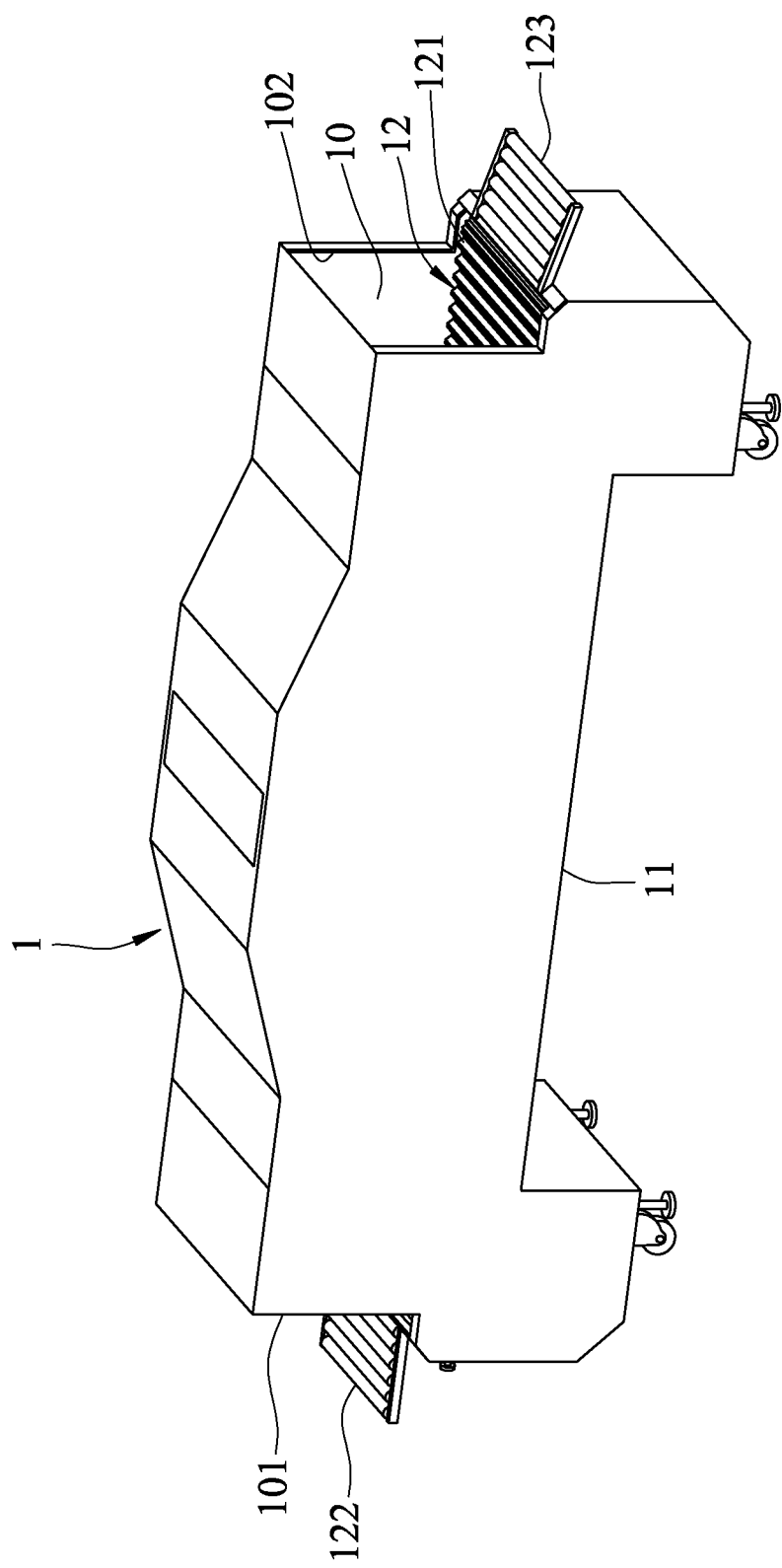
FIG. 1 is a perspective view of an oven for drying a shoe component disclosed in Taiwanese Patent No. I468139B.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 2 to 8, a smart oven 100 according to the first embodiment of the present disclosure is shown to include a box body unit 2, a heating unit 3, a feed unit 4 and an exhaust unit 5.

The box body unit 2 includes a box body 21, and a base 22 connected to a bottom side of the box body 21. The box body 21 has a first inner wall surface 211, two second inner wall surfaces 212 and two third inner wall surfaces 213. The first inner wall surface 211 extends horizontally in a left-right direction (X). The second inner wall surfaces 212 are spaced apart from each other in the left-right direction (X), and are connected angularly and respectively to left and right ends of the first inner wall surface 211. The third inner wall surfaces 213 are spaced apart from each other in a front-rear direction (Y) transverse to the left-right direction (X), and are connected angularly and respectively to front and rear ends of the first inner wall surface 211. One of the third inner wall surfaces 213 is further angularly connected to front ends of the second inner wall surfaces 212, while the other third inner wall surface 213 is further angularly connected to rear ends of the second inner wall surface 212. The first, second and third inner wall surfaces 211, 212, 213 cooperatively define a heating chamber 200 having a chamber opening 214 that faces downward and that is opposite to the first inner wall surface 211 in a top-bottom direction (Z) transverse to the left-right direction (X) and the front-rear direction (Y). In this embodiment, the angle between each second inner wall surface 212 and the first inner wall surface 211 is 90°, and the angle between each of the third inner wall surfaces 213 and a corresponding one of the first and second inner wall surfaces 211, 212 is also 90°.

The base 22 defines a feed space 220 communicating with the chamber opening 214 and having a feed opening 221 communicating the feed space 220 with an external environment. The base 22 has a first air inlet 223 and a second air inlet 224 respectively formed in two opposite lateral sides thereof and both communicating with the feed space 220.

The box body 21 further has a partition wall 23 disposed in and dividing the heating chamber 200 into a first heating zone 201 and a second heating zone 202, a first venting hole 215 extending through the first inner wall surface 211 and a top side thereof and communicating with the first heating zone 201, a second venting hole 216 that extends through the first inner wall surface 211 and the top side thereof, that is spaced apart from the first venting hole 215 and that communicates with the second heating zone 202, a first flow outlet 217 formed in a bottom side thereof and communicating with the first heating zone 201 and the feed space 220, and a second flow outlet 218 formed in the bottom side thereof spaced apart from the first flow outlet 217 and communicating with the second heating zone 202 and the feed space 220. The partition wall 23 is connected to the first inner wall surface 311 and the third inner wall surfaces 213 (see FIG. 3), and extends across the chamber opening 214. Alternatively, the box body 21 may have only one heating zone, and may still have the same heating effect.

The heating unit 3 is accommodated in the heating chamber 200, and includes a heating device 31, and two lamp mounting frames 32 respectively disposed in the first and second heating zones 201, 202 and located above the chamber opening 214. It should be noted herein that the partition wall 23 has two opposite partition wall surfaces 231 respectively facing the first and second heating zones 201, 202. Each partition wall surface 231 has an upper surface portion 232 proximate to the first inner wall surface 211, a lower surface portion 233 proximate to the chamber opening 214, and a middle surface portion 234 extending obliquely from the upper surface portion 232 toward the second heating zone 202 and connected to the lower surface portion 233. Through this, the positions of the lamp mounting frames 32 are staggered in the top-bottom direction (Z) to save space.

With reference to FIGS. 3 to 6, the heating device 31 includes a plurality of upper lamp holders 311, a plurality of outer lamp holders 312, a plurality of inner lamp holders 313, a plurality of upper radiation heating lamps 314 respectively mounted on the upper lamp holders 311, a plurality of outer radiation heating lamps 315 respectively mounted on the outer lamp holders 312, and a plurality of inner radiation heating lamps 316 respectively mounted on the inner lamp holders 313. In this embodiment, two upper lamp holders 311, five outer lamp holders 312, and one inner lamp holder 313 are mounted on the lamp mounting frame 32 disposed in the first heating zone 201. One of the outer lamp holders 312 is proximate and parallel to one of the second inner wall surfaces 212. The other four outer lamp holders 312 are grouped in pairs, each pair of which is proximate and parallel to a respective one of the third inner wall surfaces 213. The inner lamp holder 313 is proximate and parallel to the lower surface portion 233 of the partition wall surface 231 facing the first heating zone 201, and is lower than the middle surface portion 234 thereof.

Further, with reference to FIGS. 3 to 7, two upper lamp holders 311, six outer lamp holders 312, and two inner lamp holders 313 are mounted on the lamp mounting frame 32 disposed in the second heating zone 202. Two of the outer lamp holders 312 are proximate and parallel to the other second inner wall surface 212, and are spaced apart from each other in the top-bottom direction (Z). The other four outer lamp holders 312 are grouped in pairs, each pair of which is proximate and parallel to the respective third inner wall surface 213. The inner lamp holders 313 are proximate and parallel to the upper surface portion 232 of the partition wall surface 231 facing the second heating zone 202, are higher than the middle surface portion 234 thereof, and are spaced apart from each other in the top-bottom direction (Z). The outer lamp holders 312 of each pair located in each of the first and second heating zones 201, 202 are spaced apart from each other in the top-bottom direction (Z). The upper lamp holders 311 located in each of the first and second heating zones 201, 202 are proximate and parallel to the first inner wall surface 211, and are spaced apart from each other in the left-right direction (X). Through the aforesaid configuration, the first and second heating zones 201, 202 can provide different heating effects.

Figure 6:
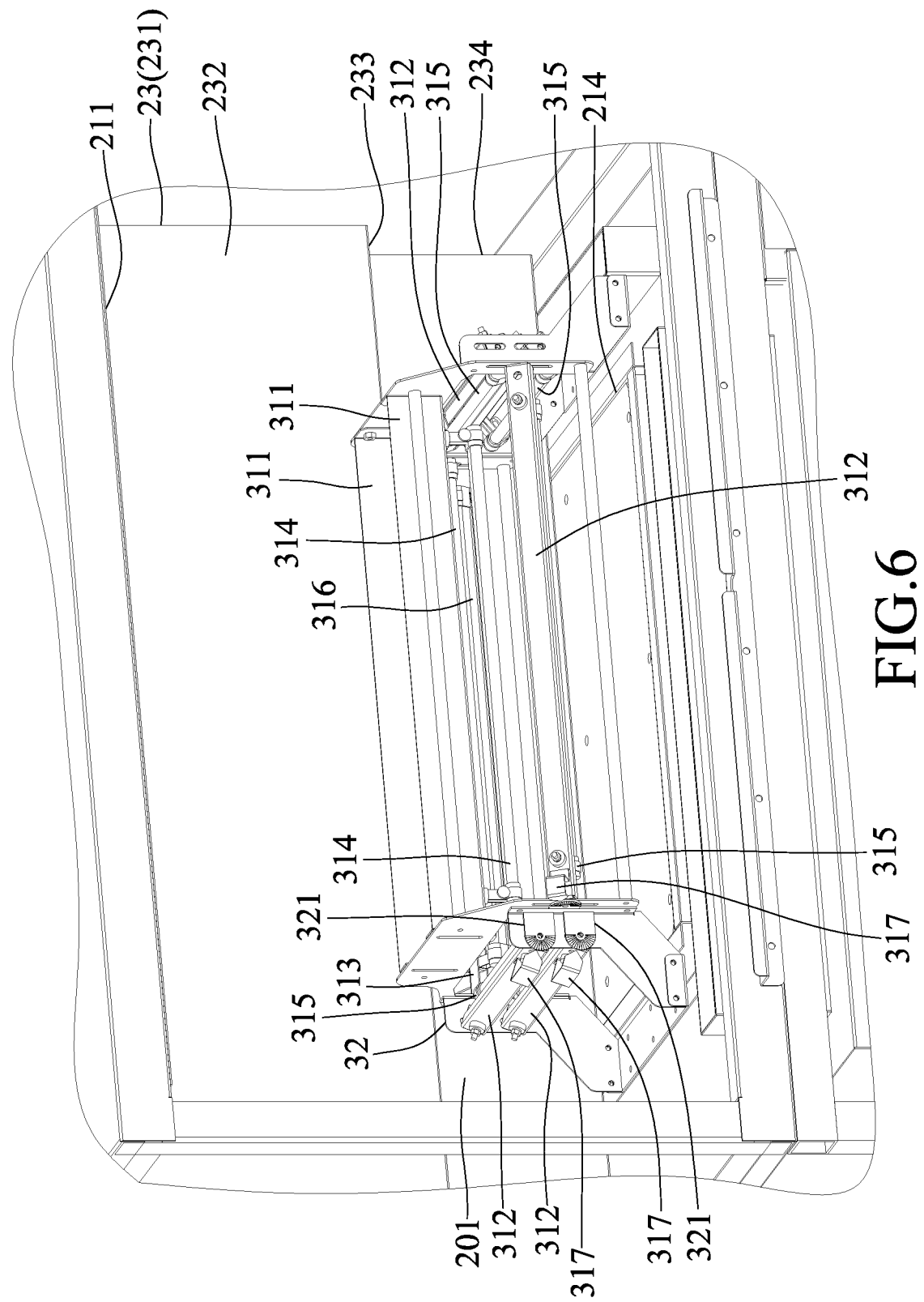
FIG. 6 is an enlarged fragmentary perspective view of the first embodiment, illustrating a lamp mounting frame located in the first heating zone.
Figure 8:
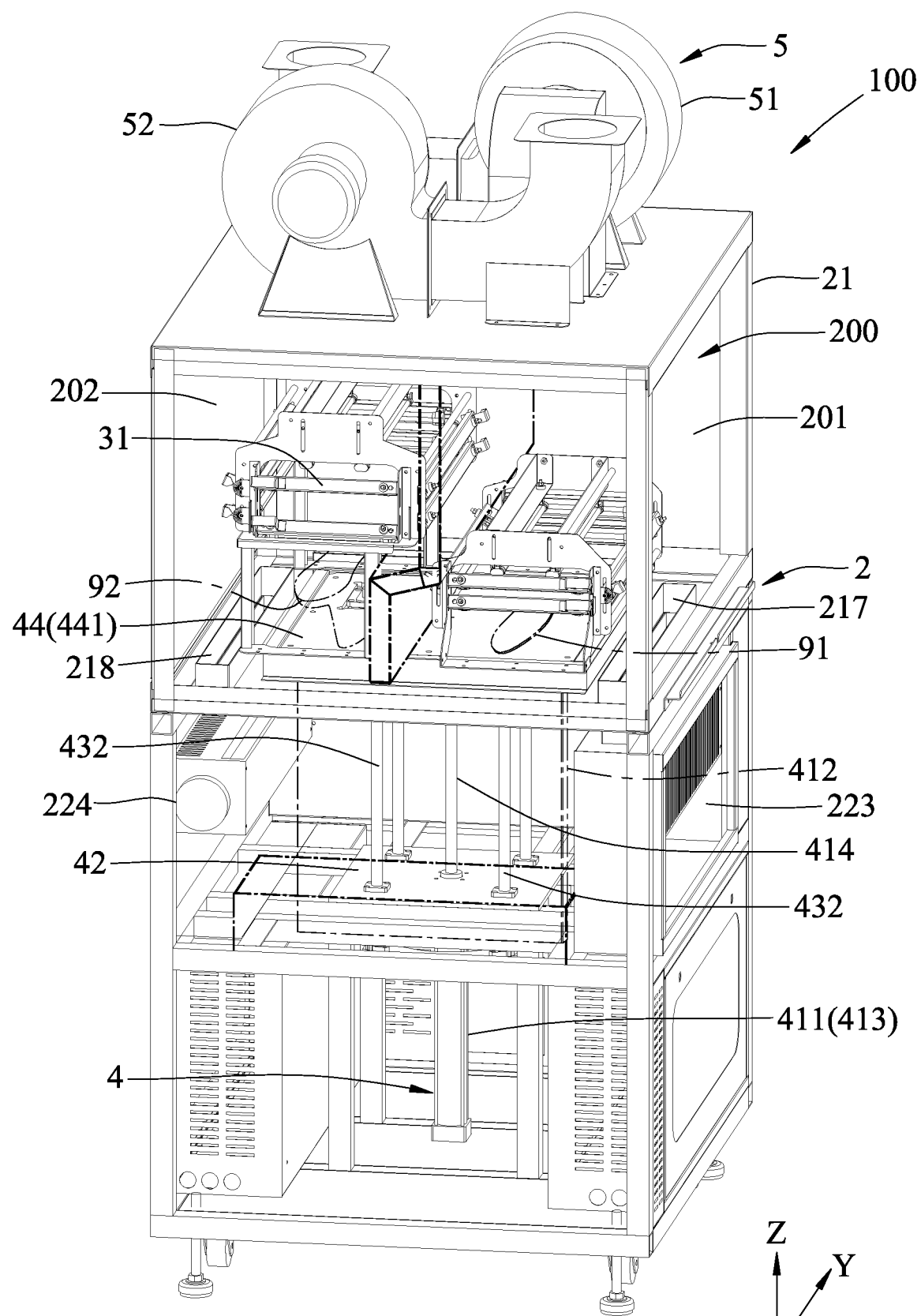
FIG. 8 is a view similar to FIG. 5, but illustrating a carrier platform in a material-operating position.

With reference to FIGS. 6 and 8, each upper lamp holder 311 in each of the first and second heating zones 201, 202 is positioned on and is adjustably movable relative to a corresponding one of the lamp mounting frames 32 along the top-bottom direction (Z) by using sets of bolts and nuts (not shown) so as to adjust the position of the respective upper radiation heating lamp 314 along the top-bottom direction (Z). Each outer lamp holders 312 in each of the first and second heating zones 201, 202 is positioned on and is rotatably adjustable relative to the corresponding lamp mounting frame 32 by using sets of bolts and nuts (not shown) so as to adjust the angle of the respective outer radiation heating lamp 315. Each inner lamp holder 313 in each of the first and second heating zones 201, 202 is positioned on and is rotatably adjustable relative to the corresponding lamp mounting frame 32 by using sets of bolts and nuts (not shown) so as to adjust the angle of the respective inner radiation heating lamp 316.

In this embodiment, each of the outer and inner lamp holders 312, 313 has a guide member 317. Each lamp mounting frame 32 has a plurality of angle-indicating members 321 respectively corresponding to the guide members 317 of the outer and inner lamp holders 312, 313. Each angle-indicating member 321 has a plurality of evenly spaced graduation marks extending from 0 to 180□. In this embodiment, each angle-indicating member 321 has 19 graduation marks, each two adjacent ones of which have a 10E interval. When each of the outer and inner lamp holders 312, 313 is rotated relative to the respective lamp mounting frame 32, the guide member 317 thereof will rotate therealong and point to an angle on the corresponding angle-indicating member 321.

It should be noted herein that each of the upper, outer and inner radiation heating lamps 314, 315, 316 of this embodiment is a mid-infrared (MIR) lamp. The mid-infrared wavelength light emitted by the MIR lamp can be easily absorbed by water molecules, so that the adhesive commonly used in shoe components can be quickly dried. This embodiment mainly uses the heating method of heat radiation to carry out the heating operation to enhance the drying efficiency.

Figure 2:
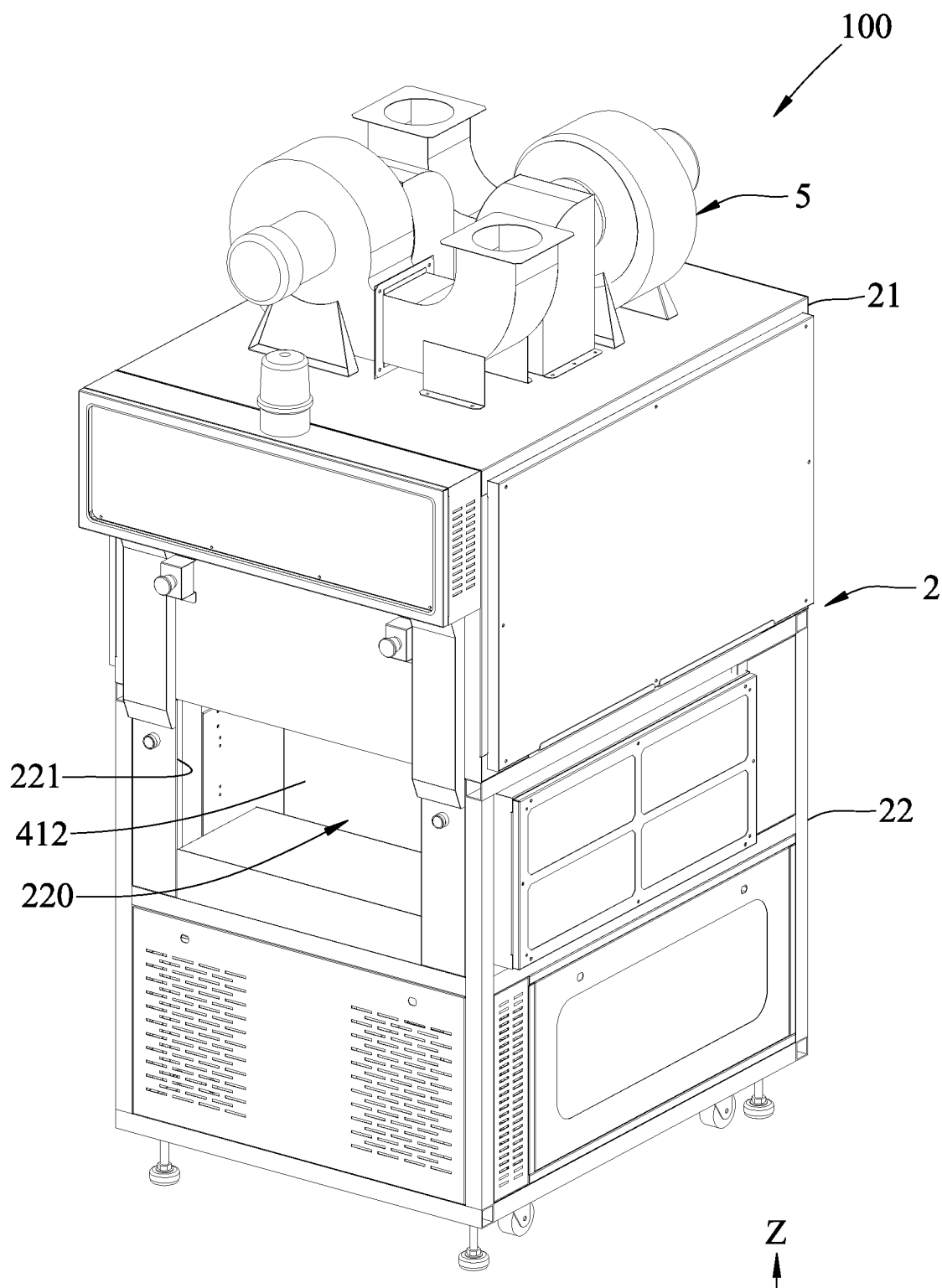
FIG. 2 is a perspective view of a smart oven according to the first embodiment of this disclosure.
Figure 5:
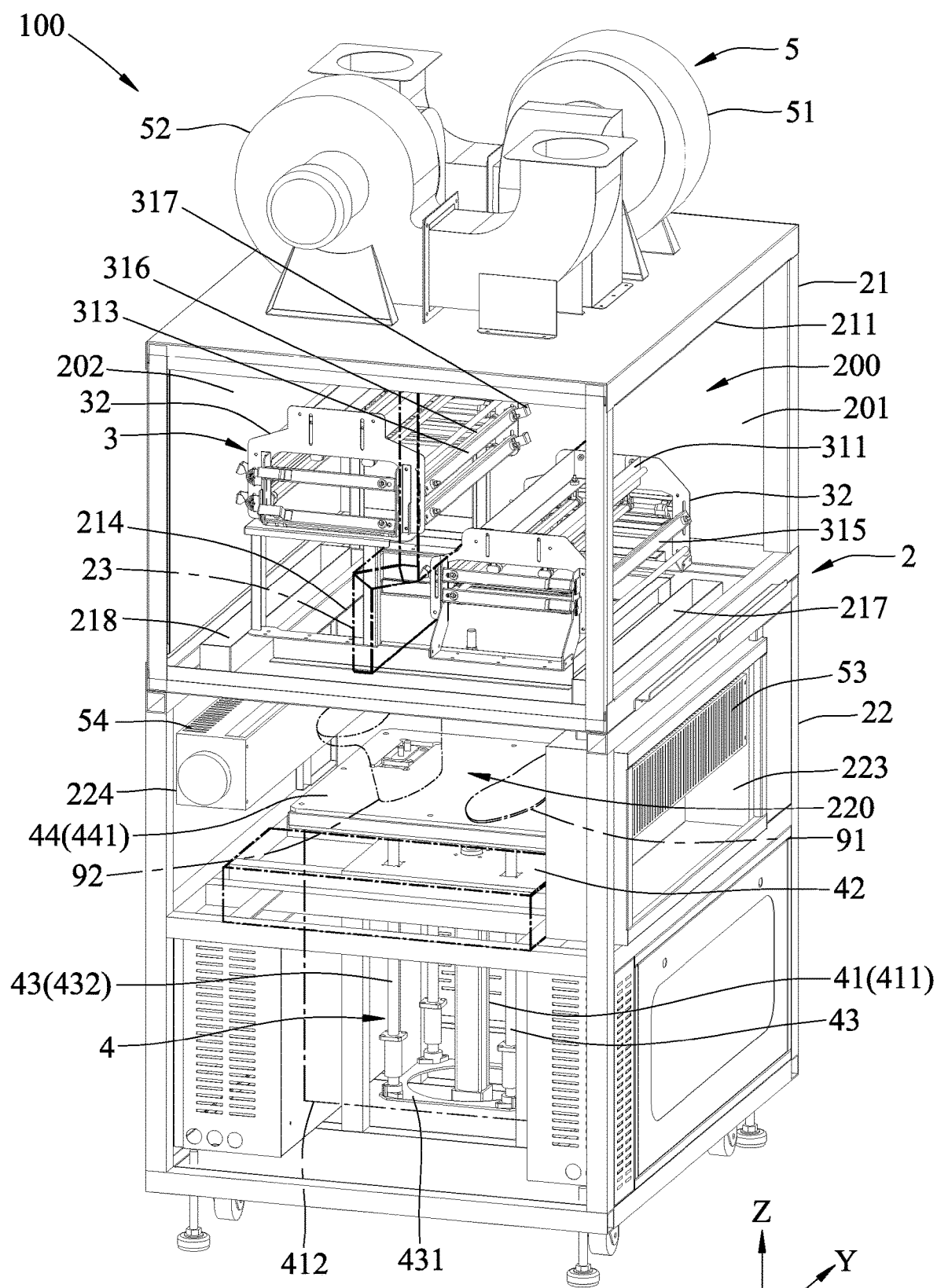
FIG. 5 is another perspective view of the first embodiment, illustrating a carrier platform in a material-placing position.

With reference to FIGS. 2, 5 and 8, the feed unit 4 includes a driving device 41, a positioning plate 42, and an auxiliary support device 43. The driving device 41 is disposed on the base 22, and includes a carrier platform 44, a drive mechanism 411 for driving the carrier platform 44 to move up and down along the top-bottom direction (Z), and a safety blocking plate 412 connected to a front end of the carrier platform 44. The carrier platform 44 is movable relative to the box body 21 between a material-placing position (see FIG. 5) and a material-operating position (see FIG. 8). The drive mechanism 411 includes a cylinder body 413 fixed to a bottom side of the base 22, and a piston rod 414 telescopically received within the cylinder body 413. The positioning plate 42 is fixed to the base 22, and is spaced apart from the carrier platform 44 in the top-bottom direction (Z). The piston rod 414 extends through the positioning plate 42, and is connected to a bottom surface of the carrier platform 44. The auxiliary support device 43 includes an annular connecting plate 431 surrounding the cylinder body 413 and located lower than the positioning plate 42, and a plurality of support rods 432 that are spacedly disposed on the annular connecting plate 431, that extend through the positioning plate 42 and that are connected to the bottom surface of the carrier platform 44. The auxiliary support device 43 supports the carrier platform 44 to further stabilize the latter during the movement thereof.

When the carrier platform 44 is in the material-placing position, the carrier platform 44 is distal from the chamber opening 214 but is proximate to the positioning plate 42, and the chamber opening 214 communicates with the feed space 220. When the carrier platform 44 is in the material-operating position, the carrier platform 44 is distal from the positioning plate 42, and closes the chamber opening 214. At the same time, the safety blocking plate 412 blocks the support rods 432 in the feed space 220 to enhance safety of the operation.

It is worth to mention herein that, although the safety blocking plate 412 is connected to the front side of the carrier platform 44 in this embodiment, in other variations of this embodiment, the safety blocking plate 412 may be connected to the annular connecting plate 431. As long as the safety blocking plate 412 can move along with the carrier platform 44 in the top-bottom direction (Z) and blocks the support rods 432 in the feed space 220 when the carrier platform 44 is in the material-operating position, any position thereof is acceptable.

Figure 7:
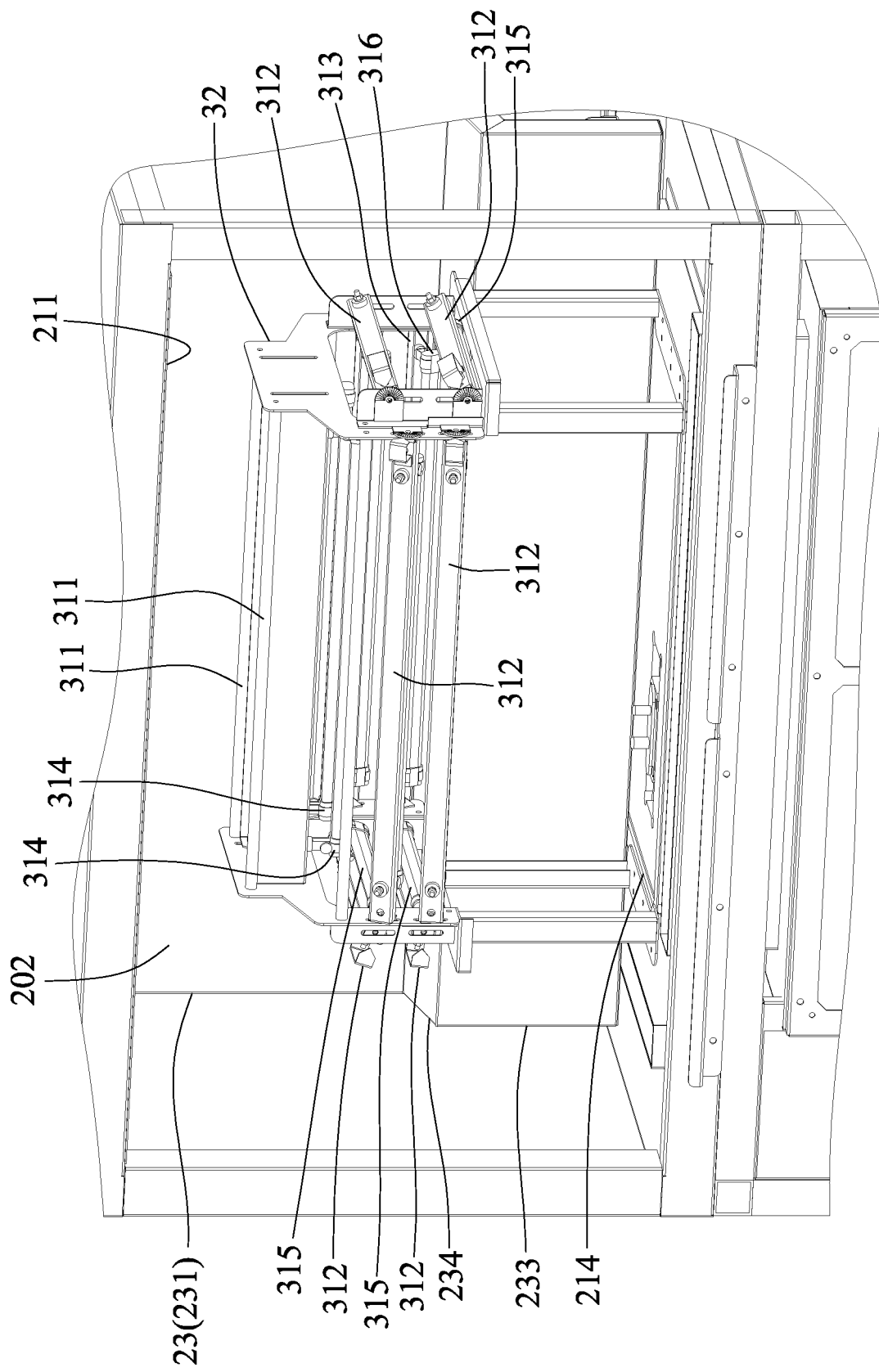
FIG. 7 is another enlarged fragmentary perspective view of the first embodiment, illustrating another lamp mounting frame located in the second heating zone.
Figure 9:
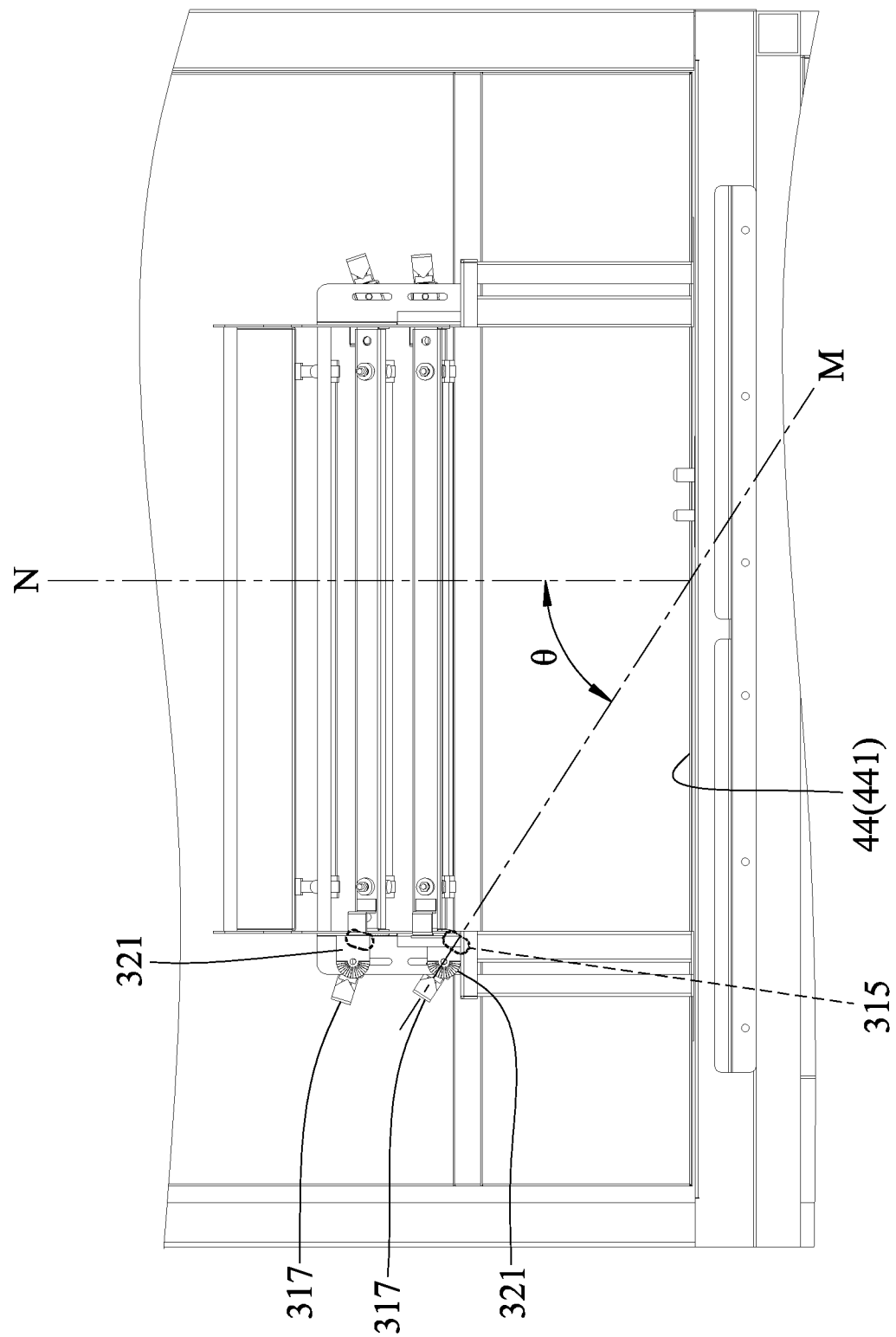
FIG. 9 is an enlarged fragmentary schematic view of the first embodiment, illustrating an angle formed by an imaginary line passing through the center of an outer radiation heating lamp and a normal line on a top surface of the carrier platform.

Referring to FIG. 9, in combination with FIG. 7, when the angle of each of the outer and inner radiation heating lamps 315, 316 is adjusted, through the cooperation of the guide member 317 of each of the outer and inner lamp holders 312, 313 with the respective angle-indicating member 321, an operator can see an angle (θ) formed by an imaginary line (M) passing through the center of each of the outer and inner radiation heating lamps 315, 316 and a normal line (N) on a top surface 441 of the carrier platform 44.

Figure 3:
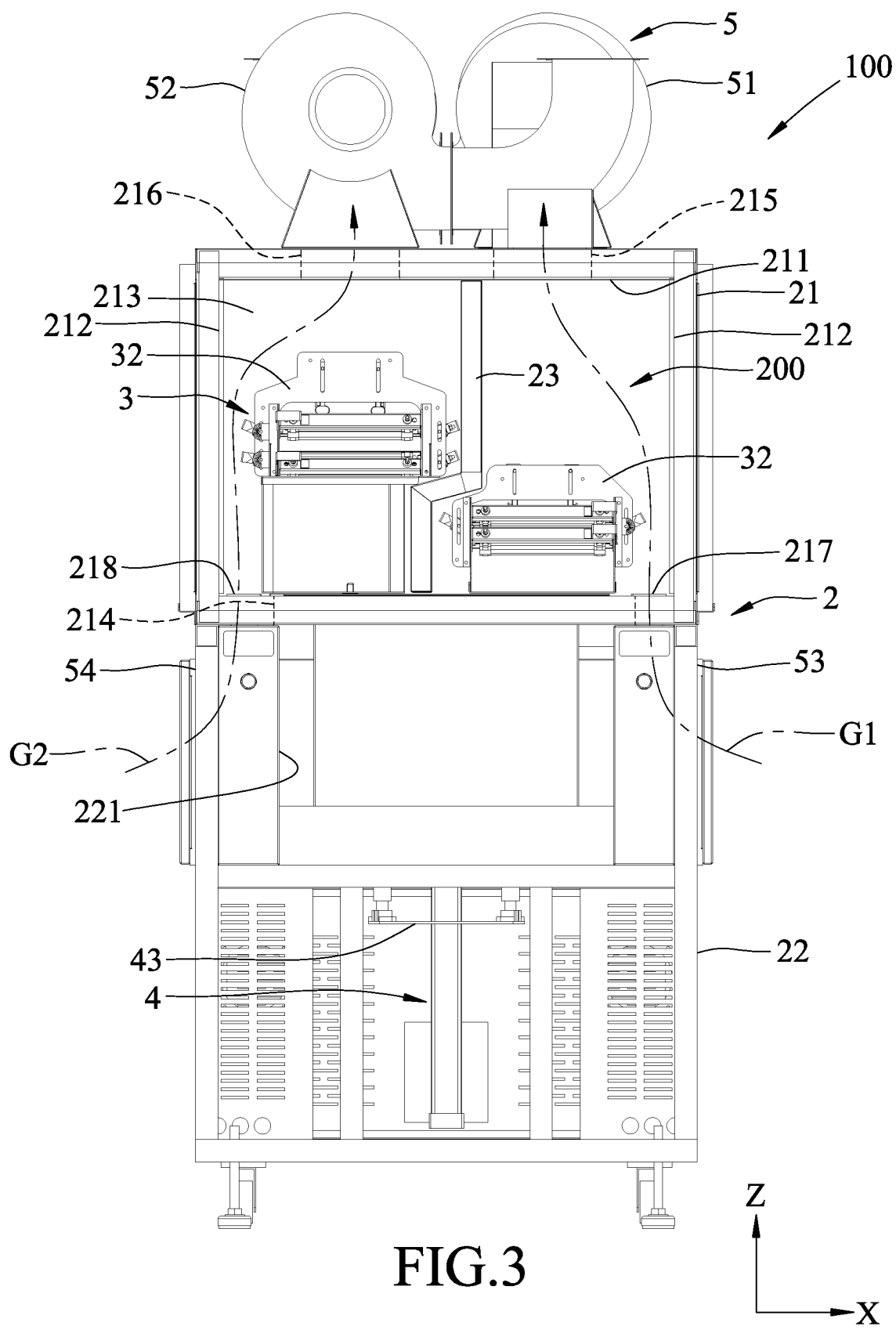
FIG. 3 is a front view of the first embodiment.
Figure 4:
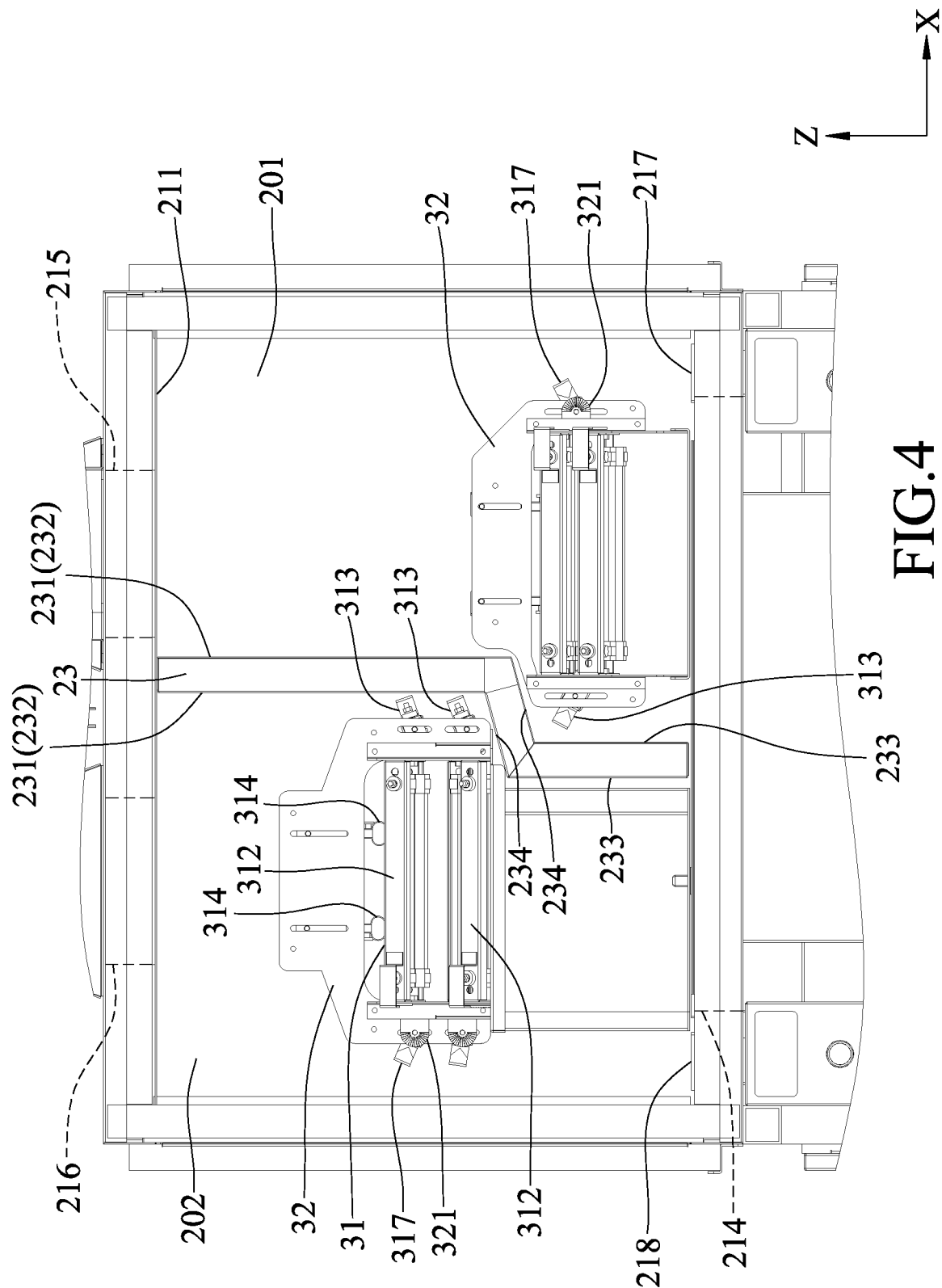
FIG. 4 is an enlarged fragmentary schematic view of FIG. 3, illustrating first and second heating zones of a heating chamber of the first embodiment.

With reference to FIGS. 3 and 8, the exhaust unit 5 includes a first fan 51 disposed on the top side of the box body 21 and communicating with the first venting hole 215, a second fan 52 disposed on the top side of the box body 21 spaced apart from the first fan 51 and communicating with the second venting hole 216, a first filter 53 disposed on the first air inlet 223, and a second filter 54 disposed on the second air inlet 224. The first fan 51 is used for forming a first exhaust path (G1) for air passing through the first air inlet 223, the first flow outlet 217, the first heating zone 201 of the heating chamber 200, and the first venting hole 215. The second fan 52 is used for forming a second exhaust path (G2) for air passing through the second air inlet 224, the second flow outlet 218, the second heating zone 202 of the heating chamber 200, and the second venting hole 216. Through this, heat inside the first and second heating zones 201, 202 can be discharged.

Figure 10:
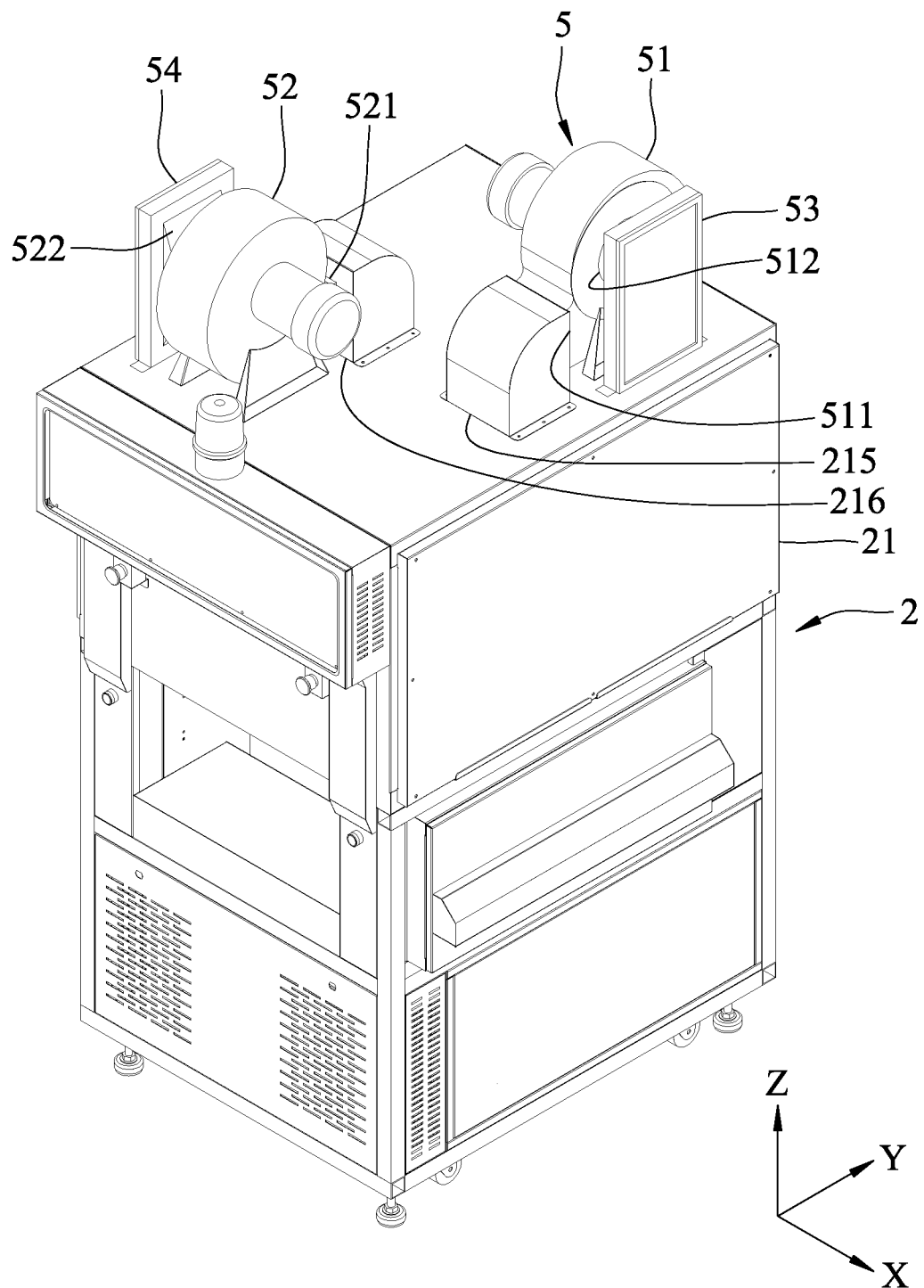
FIG. 10 is a view similar to FIG. 2, but illustrating a variation of an exhaust unit of the first embodiment.

The exhaust unit 5 of this embodiment is designed to exhaust air upwardly. That is, the first and second exhaust paths (G1, G2) (see FIG. 3) extend from a bottom-to-top direction. However, in other variations of this embodiment, as shown in FIG. 10, the exhaust unit 5 may be designed to exhaust air downwardly by turning the first and second fans 51, 52 such that air outlets 511, 521 of the first and second fans 51, 52 respectively communicate with the first and second venting holes 215, 216, and the first and second filters 53, 54 are respectively disposed on air inlets 512, 522 of the first and second fans 51, 52, so that the first and second exhaust paths (G1, G2) may extend in a top-to-bottom direction. Heat can similarly be discharged through this configuration.

Referring back to FIGS. 5 and 8, an operating process for simultaneously drying two different shoe components using the smart oven 100 of this embodiment will be illustrated below. The shoe components exemplified herein are a sole 91 and an upper 92, but not limited thereto.

First, the carrier platform 44 is disposed in the material-placing position (see FIG. 5), after which the sole 91 and the upper 92 are placed on the left and right sides of the top surface 441 of the carrier platform 44 through the feed opening 221 (see FIG. 2) of the base 22. Next, the drive mechanism 411 is activated to drive the carrier platform 44 to move from the material-placing position to the material-operating position (see FIG. 8) along the top-bottom direction (Z). Since the volume of the upper 92 is larger than the sole 91, and the upper 92 needs more heat to dry, the sole 91 is placed in the first heating zone 201, while the upper 92 is placed in the second heating zone 202. After the sole 91 and the upper 92 are heated by the heating device 31 for a period of time, the carrier platform 44 is driven to move downward back to the material-placing position. The heated and dried sole 91 and upper 92 can then be removed from the carrier platform 44 through the feed opening 221. Hence, the drying operation of the sole 91 and the upper 92 are simultaneously completed, and the next operating process may follow.

From the foregoing description, the advantages of this embodiment may be summarized as follows:

1. The carrier platform 44 is moved along the top-bottom direction (Z) to the heating chamber 200 for heating operation of the shoe components, so that, in comparison with the prior art, the size of the smart oven 100 of this embodiment in the left-right direction (X) can be reduced. Further, through the chamber opening 214, a dual effect of placing and removing the shoe components to and from the carrier platform 44 can be achieved, and there is no need to provide another opening. Thus, the smart oven 100 of this disclosure has a reduced volume, so that it does not occupy a substantial space, and arrangement of the production line is easy.

2. The heating unit 3 performs heating of the sole 91 and the upper 92 in three directions (top, left-right, and front-rear directions). In comparison with the prior art, this embodiment further has the front-rear direction of heating. Moreover, the light emitted by the MIR lamps of this disclosure has wavelengths easier to be absorbed by water molecules, so that the drying effect of the sole 91 and the upper 92 can be significantly increased.

3. By using the partition wall 23 to divide the heating chamber 200 into the first and second heating zones 201, 202, and by using the lamp mounting frames 32 to mount different numbers of the outer and inner radiation heating lamps 315, 316, the first and second heating zones 201, 202 are permitted to simultaneously heat the sole 91 and the upper 92 which require different heating conditions, so that the operating time for heating and drying can be greatly saved.

4. The angle (θ) formed by the imaginary line (M) passing through the center of each of the outer and inner radiation heating lamps 315, 316 and the normal line (N) on the top surface 441 of the carrier platform 44 can be adjusted, and the position of the upper radiation heating lamps 314 along the top-bottom direction (Z) can also be adjusted, so that appropriate heating conditions can be selectively used according to the different shoe components. Through this, an average temperature effect during heating can be enhanced, and the utilization efficiency of heat energy can be greatly improved.

5. Through the cooperation of each guide member 317 with the respective angle-indicating member 321, the operator can easily and accurately see the angle (θ) formed by the imaginary line (M) passing through the center of each of the outer and inner radiation heating lamps 315, 316 and the normal line (N) on the top surface 441 of the carrier platform 44, thereby reducing the temperature difference between the heating and drying operations each time they are performed and thereby enhancing the process capability.

6. During heating, with the safety blocking plate 412 blocking the support rods 432 in the feed space 220, the operator is prevented from accidentally touching the drive mechanism 411, so that machine safety can be enhanced.

7. Through the support rods 432 of the auxiliary support device 43, the movement of the carrier platform between the material-placing position and the material-operating position can be ensured to be stable and smooth.

Figure 11:
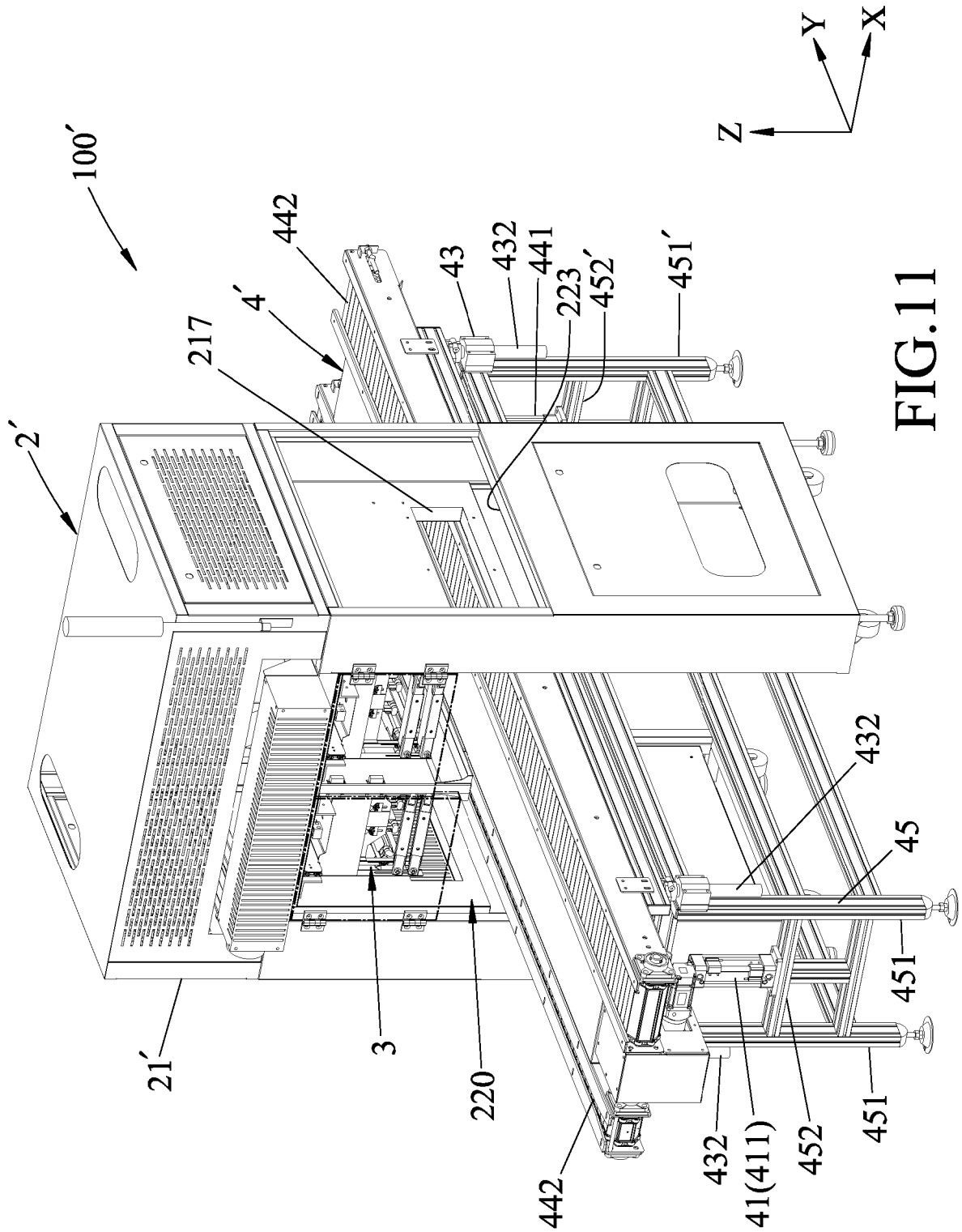
FIG. 11 is a perspective view of a smart oven according to the second embodiment of this disclosure.
Figure 12:
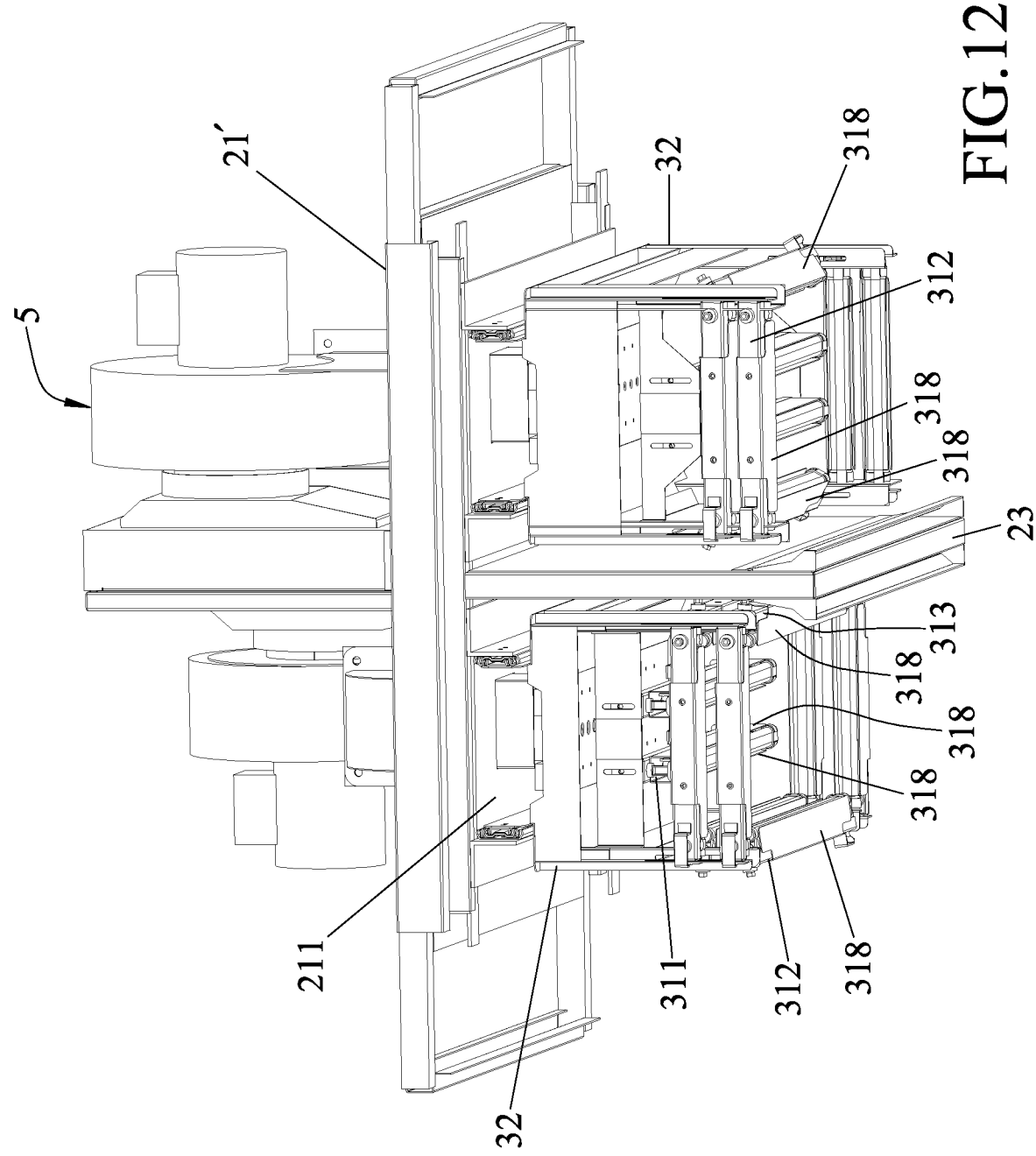
FIG. 12 is a bottom perspective view of the second embodiment, but without the feed unit, illustrating the heating unit connected to the first inner wall surface of the box body and hanging therefrom.
Figure 13:
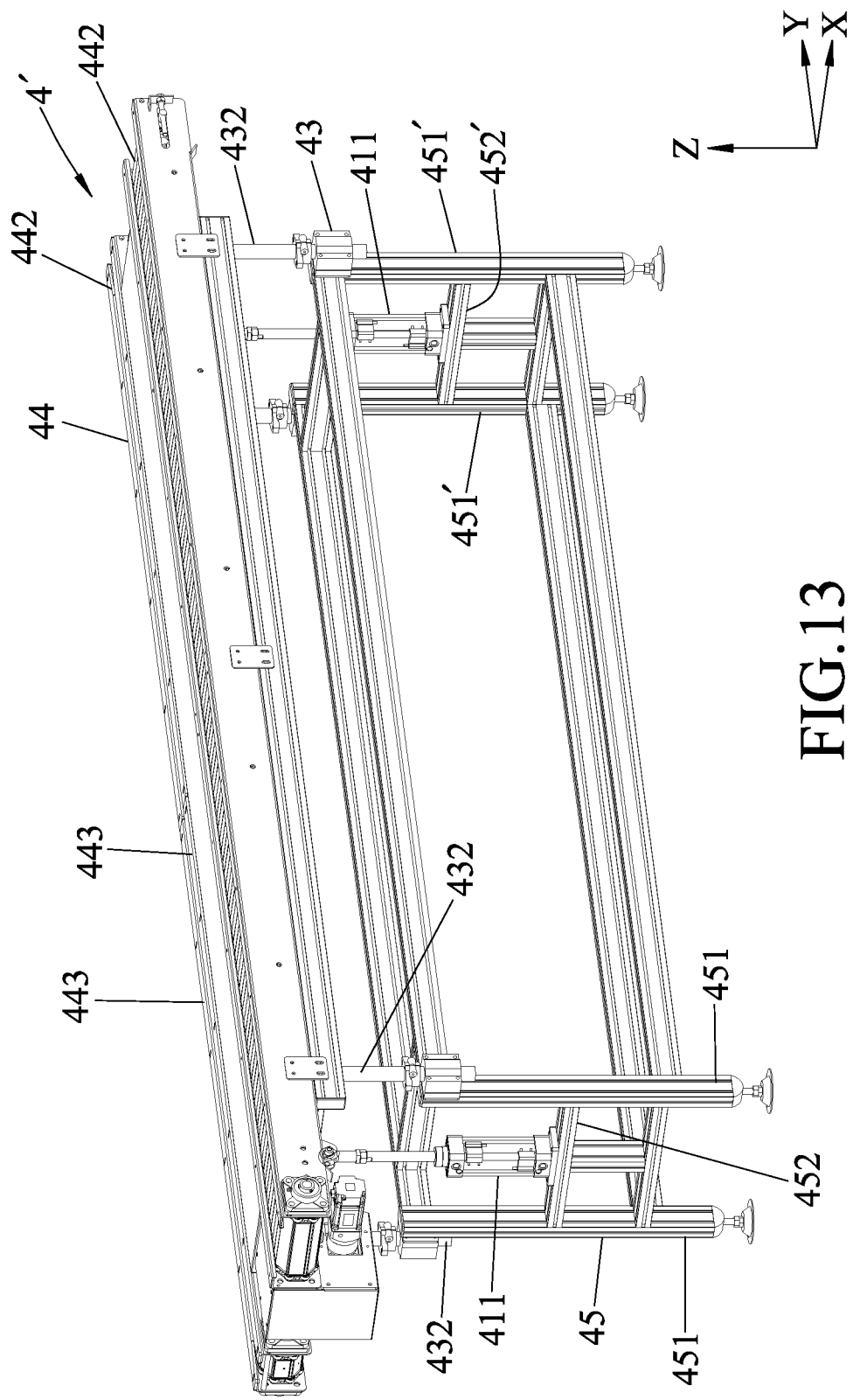
FIG. 13 is a perspective view of the feed unit of the second embodiment.

Referring to FIGS. 11 to 13, a smart oven 100' according to the second embodiment of the present disclosure is shown to be substantially identical to the first embodiment. Particularly, the smart oven 100' includes a box body unit 2', a heating unit 3, a feed unit 4' and an exhaust unit 5. However, in the second embodiment, the box body 21' of the box body unit 2' has a substantially inverted U-shape, and defines the feed space 220 having two ends opposite in the front-rear direction (Y) and communicating with the external environment. The base 22 (see FIG. 2) of the box body unit 2' is dispensed herewith. The first flow outlet 217 and the second flow outlet 218 are respectively formed in two opposite lateral sides of the box body 21'. The first air inlet 223 is formed in one of the lateral sides of the box body 21', and communicates with the feed space 220 via the first flow outlet 217. The second air inlet (not visible) is formed in the other lateral side of the box body 21' opposite to the first air inlet 223, and communicates with the feed space 220 via the second flow outlet 218. The partition wall 23 extends downwardly and transversely from the first inner wall surface 211 of the box body 21'.

The lamp mounting frames 32 are fixed to and hung from the first inner wall surface 211 of the box body 21'. Each of the upper, outer and inner lamp holders 311, 312, 313 has two opposite lamp covers 318 covering a corresponding one of the upper, outer and inner radiation heating lamps 314, 315, 316 (see FIG. 6) so as to maintain the heat energy thereof, so that the heat sources can be stabilized.

The feed unit 4' further includes a support frame 45 mounted upright on the ground and extending through the feed space 220 along the front-rear direction (Y). The support frame 45 has two spaced-apart front support legs 451, a front crossbar 452 interconnecting the front support legs 451, two spaced-apart rear support legs 451', and a rear cross bar 452' interconnecting the rear support legs 451'. The positioning plate 42 (see FIG. 8) is dispensed herewith. The carrier platform 44 is disposed on top of the support frame 45, and has two spaced-apart feed rails 442 movable along the front-rear direction (Y) in a single direction. The feed rails 442 are conveyor belts. One of the feed rails 442 is used for conveying the sole 91 (see FIG. 5), while the other feed rail 442 has two spaced-apart guide portions 443 for clamping the upper 92 (see FIG. 5) and for conveying the same. The driving device 41 includes two drive mechanisms 411 respectively disposed on the front and rear cross bars 452, 452' and respectively connected to front and rear ends of the carrier platform 44. Each drive mechanism 411 is a press cylinder. The auxiliary support device 43 is connected to the carrier platform 44 and the support frame 45, and has four support rods 432. The annular connecting plate 431 (see FIG. 5) is dispensed herewith. Two of the support rods 432 are located below the front end of the carrier platform 44 and are respectively disposed on the front support legs 451 such that one of the drive mechanisms 411 is located therebetween. The other two support rods 432 are located below the rear end of the carrier platform 44 and are respectively disposed on the rear support legs 451' such that the other drive mechanism 411 is located there-between. The auxiliary support device 43 can similarly support and stabilize the carrier platform 44 during the movement thereof.

The present disclosure can be applied to an automated shoemaking line through the carrier platform 44 of conveyor belt type. After the upper 92 and the sole 91 are moved from the previous workstation to the carrier platform 44, the feed rails 442 respectively convey the upper 92 and the sole 91 to the feed space 220, after which the drive mechanisms 411 are activated to drive the carrier platform 44 to move upward along the top-bottom direction (Z) to the material-operating position, so that the upper 92 and the sole 91 can be simultaneously heated and dried. Next, the carrier platform 44 is driven to move downward back to the material-placing position. Finally, the dried upper 92 and the dried sole 91 are conveyed to the next workstation by the feed rails 442 for continuous processing thereof. Thus, automated shoemaking can be realized.

In sum, the carrier platform 44 of the smart oven 100, 100' of this disclosure is movable upward and downward, so that the overall volume of the smart oven 100 can be reduced so as not to occupy a substantial space. Thus, the arrangement of the production line is easy. Further, since heating is performed in three different directions, a good drying effect can be achieved. Therefore, the object of this disclosure can indeed be achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A smart oven comprising:
    a box body unit including a box body that has a first inner wall surface extending horizontally in a left-right direction, two second inner wall surfaces connected angularly and respectively to left and right ends of said first inner wall surface, and two third inner wall surfaces connected angularly and respectively to front and rear ends of said first inner wall surface, one of said third inner wall surfaces being further angularly connected between front ends of said second inner wall surfaces, the other one of said third inner wall surfaces being further angularly connected between rear ends of said second inner wall surfaces;
    said first, second and third inner wall surfaces cooperatively defining a heating chamber that has a chamber opening facing downward;
    a heating unit accommodated in said heating chamber and including a plurality of upper radiation heating lamps disposed above said chamber opening, and a plurality of outer radiation heating lamps disposed in proximity to said second inner wall surfaces and said third inner wall surfaces; and
    a feed unit disposed on said box body unit and including a carrier platform, and a drive mechanism for driving said carrier platform to move up and down along a top-bottom direction transverse to the left-right direction, said carrier platform being movable relative to said box body between a material-placing position, in which said carrier platform is distal from said chamber opening, and a material-operating position, in which said carrier platform closes said chamber opening; and
    an exhaust unit disposed on said box body unit;
    wherein said box body unit includes a base defining a feed space that communicates with said heating chamber through said chamber opening and that has a feed opening communicating said feed space with an external environment, said base having a first air inlet communicating with said feed space, said box body further having a first venting hole provided in a top side thereof and communicating with said heating chamber, and a first flow outlet provided in a bottom side thereof and communicating with said heating chamber and said feed space, said exhaust unit including a first fan communicating with said first venting hole, said first fan being used for forming a first exhaust path for air passing through said first air inlet, said first flow outlet, said heating chamber, and said first venting hole.

2. The smart oven as claimed in claim 1, wherein each of said upper and outer radiation heating lamps is a mid-infrared (MIR) lamp.

3. The smart oven as claimed in claim 2, wherein each of said outer radiation heating lamps is rotatable to adjust an angle formed by an imaginary line passing through the center of each of said outer radiation heating lamps and a normal line on a top surface of said carrier platform, and the position of each of said upper radiation heating lamps is adjustable along the top-bottom direction.

4. The smart oven as claimed in claim 3, wherein said heating unit further includes a lamp mounting frame disposed on said box body, and a plurality of outer lamp holders disposed on said lamp mounting frame, said outer radiation heating lamps being respectively mounted on said outer lamp holders, said lamp mounting frame having a plurality of angle-indicating members respectively corresponding to said outer lamp holders, each of said outer lamp holders being rotatable relative to said lamp mounting frame, and having a guide member corresponding to a respective one of said angle-indicating members, said guide member of each of said outer lamp holders cooperating with the respective one of said angle-indicating members to obtain the angle formed by the imaginary line passing through the center of each of said outer radiation heating lamps and the normal line on the top surface of said carrier platform.

5. The smart oven as claimed in claim 1, wherein said feed unit further includes a positioning plate spaced apart from said carrier platform in the top-bottom direction, said carrier platform being proximate to said positioning plate when said carrier platform is in the material-placing position, and being distal from said positioning plate when said carrier platform is in the material-operating position.

6. The smart oven as claimed in claim 5, wherein said feed unit further includes an auxiliary support device connected to said carrier platform, said auxiliary support device having an annular connecting plate surrounding said drive mechanism and disposed below said positioning plate, and a plurality of support rods that are spacedly disposed on said annular connecting plate, that extend through said positioning plate and that are connected to said carrier platform.

7. The smart oven as claimed in claim 1, wherein said box body further has a partition wall disposed in and dividing said heating chamber into a first heating zone and a second heating zone, said partition wall having two opposite partition wall surfaces respectively facing said first and second heating zones.

8. The smart oven as claimed in claim 7, wherein said base is connected to a bottom side of said box body, said chamber opening communicating with said feed space when said carrier platform is in the material-placing position.

9. The smart oven as claimed in claim 8, wherein said heating unit further includes a plurality of inner radiation heating lamps proximate to said partition wall surfaces, said base further having a second air inlet communicating with said feed space, said box body further having a second venting hole provided in said top side thereof spaced apart from said first venting hole and communicating with said second heating zone, and a second flow outlet provided in said bottom side thereof spaced apart from said first flow outlet and communicating with said second heating zone and said feed space, said exhaust unit further including a second fan communicating with said second venting hole, said second fan being used for forming a second exhaust path for air passing through said second air inlet, said second flow outlet, said second heating zone, and said second venting hole.

10. The smart oven as claimed in claim 6, wherein said feed unit further includes a safety blocking plate disposed on a front end of said carrier platform to block said support rods in said feed space when said carrier platform is in the material-operating position.

\* \* \* \* \*